United States Patent [19]

Estes et al.

[11] 4,109,042
[45] Aug. 22, 1978

[54] BEAD SEAM CONSTRUCTION AND METHOD OF FORMING

[75] Inventors: Lewis W. Estes; Paul W. Johns, both of Kewanee, Ill.

[73] Assignee: The Schaffer Company, Kewanee, Ill.

[21] Appl. No.: 739,731

[22] Filed: Nov. 8, 1976

[51] Int. Cl.² .............................................. B32B 3/02
[52] U.S. Cl. .................................... 428/193; 156/88; 156/245; 156/267; 156/268; 156/278; 156/285; 156/304; 156/305; 427/209; 428/57; 428/58; 428/194; 428/196
[58] Field of Search .................... 428/57, 58, 193, 194, 428/196; 156/88, 245, 267, 268, 278, 285, 304, 305; 427/209

[56] References Cited

U.S. PATENT DOCUMENTS

| | | | |
|---|---|---|---|
| 2,624,886 | 1/1953 | Herman | 428/57 |
| 3,026,225 | 3/1962 | Ostby | 428/57 |
| 3,664,907 | 5/1972 | Price | 428/57 |
| 3,947,619 | 3/1976 | Wank | 428/57 |

*Primary Examiner*—Marion E. McCamish
*Attorney, Agent, or Firm*—Hill, Gross, Simpson, Van Santen, Steadman, Chiara & Simpson

[57] ABSTRACT

A seam between a pair of porous layers of sheet material includes a bead of cured nitrile latex material disposed on one side of one of the layers and extending transversely through the pores of both layers. The same is produced in its preferred form by first tensioning the juxtaposed layers, which are then clamped between a knife edge and a backup plate to define at least one lateral limit of the seam where the porosity is thus temporarily eliminated, after which liquid nitrile latex material is passed under pressure along the knife edge and toward the backup plate. The first layer filters out any latex film or cured particles or air bubbles which thus do not impair the integrity of the seam. The latex is then cured, and if desired, the sheet material is trimmed away at one side of the seam.

12 Claims, 5 Drawing Figures

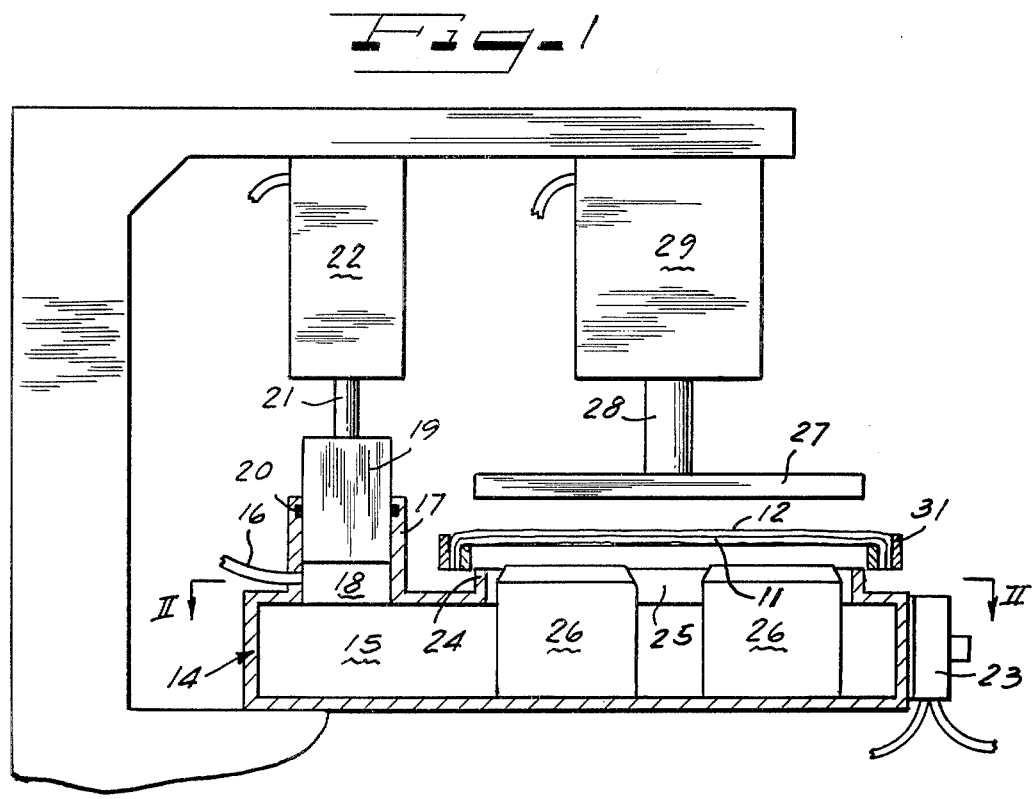
Fig-1
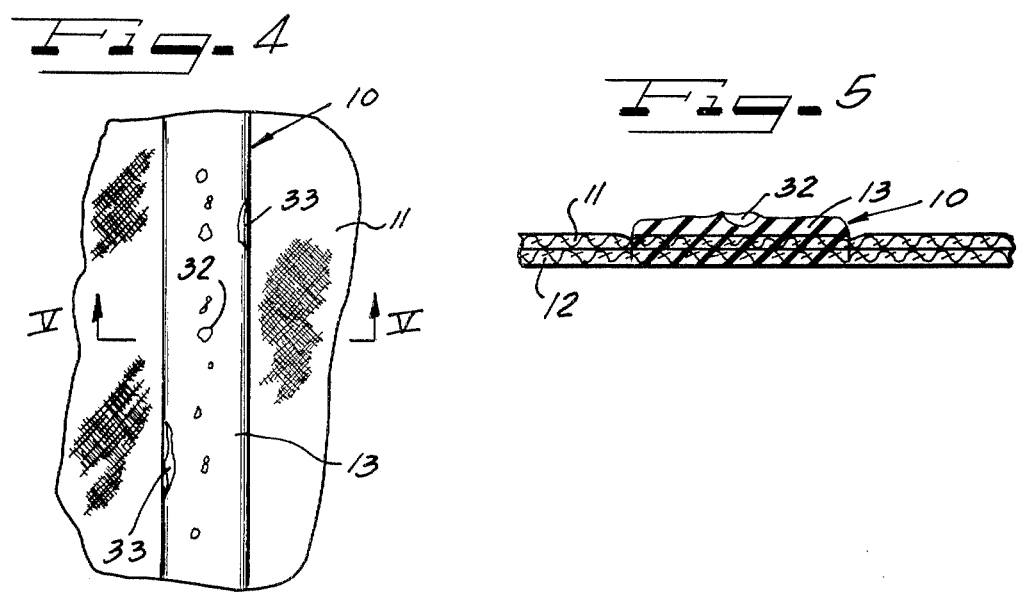
Fig-4
Fig-5

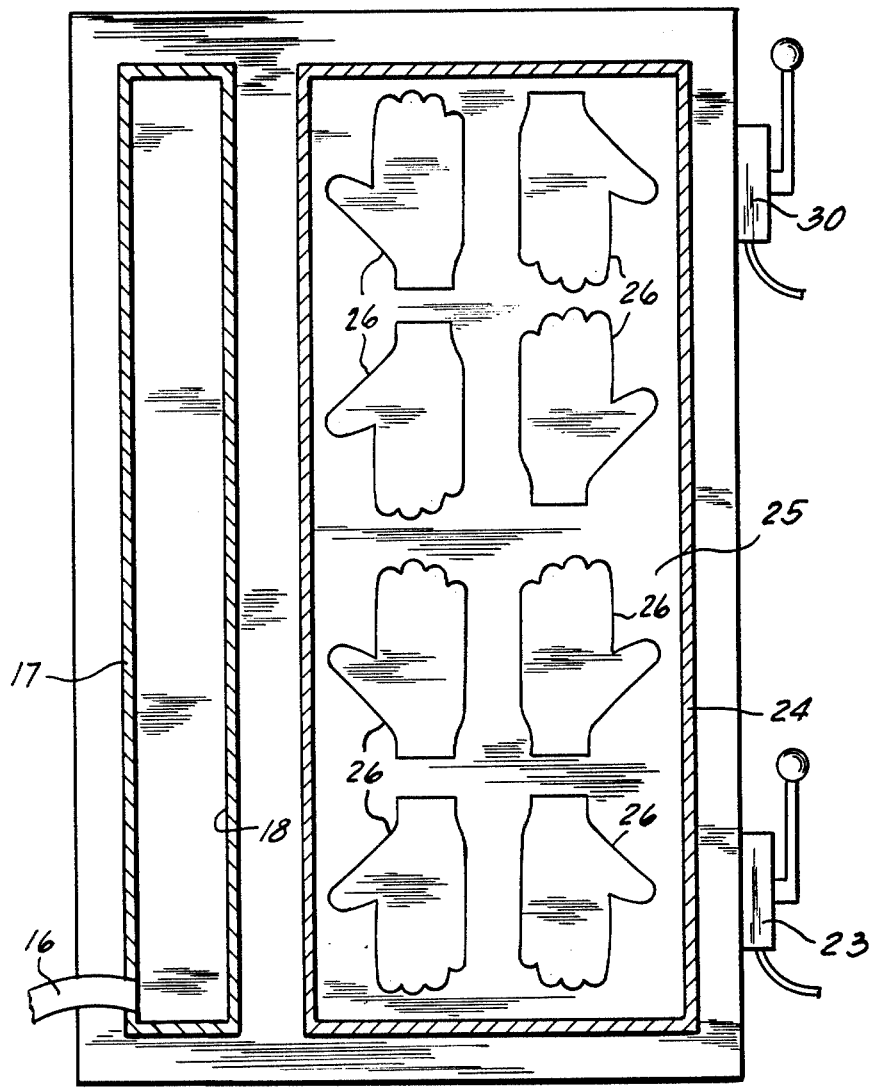
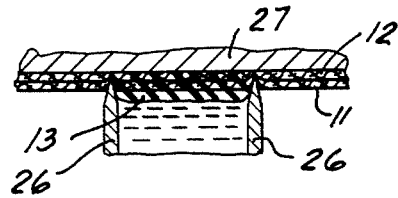

BEAD SEAM CONSTRUCTION AND METHOD OF FORMING

BACKGROUND OF THE INVENTION

1. Field of the Invention

The invention relates to a seam and a method of making the same.

2. Prior Art

It has been known heretofore to use various types of sheet material in making various types of clothing, including disposable clothing, including by way of example only, knitted cotton, nylon, woven cotton, canvas and nonwoven materials including paper. All such materials are hereafter referred to as clothing-type porous sheet material. Also, it has been shown to provide seams in such layers, a typical method being to sew the layers together with the article being made inside out, after which sewing it is reversed. It is also known to substitute for such sewing, an adhesive or, with appropriate material, a heat-seal. Where an adhesive is used, it is placed between the layers and is drawn by porosity into the facing surfaces of the layers. Where a heat seal has been used, the material itself of the two layers is melted together. One disadvantage of the heat seal is that not all materials can be so joined. Another disadvantage is that the melted joint, when set, is relatively hard, being harder than either of the layers of material were in the first instance. This property provides discomfort to the user and possibly impairment, for example if the seam were around the finger of a glove or thumb of a mitten. Further, prior methods have required relatively expensive and sophisticated machinery, such as a sewing machine, along with skilled operators for the same with the result that clothing intended to be of the disposable type is not particularly inexpensive. Adhesive is undesirable.

SUMMARY OF THE INVENTION

According to the invention, a seam is provided between a pair of layers of clothing-type porous sheet material by means of a bead of cured nitrile latex material disposed on one side of one of the layers, a portion of the bead material extending transversely through the one layer and transversely into the pores of the other layer. Preferably the liquid nitrile latex is kept from spreading during application by means of the application of a force to the layers, such as by placing the layers between a knife edge and a backup plate whereby the porosity of the layers is temporarily eliminated. During application of the latex, the layers are tensioned in both horizontal directions and are kept under tension until the latex material has cured. Various problems arising in the practice of the method of this invention have also been resolved as explained herein.

Accordingly, it is an object of the present invention to provide a seam construction, together with a method for making such seam construction.

A further object of the present invention is to provide a seam that is applied in liquid form.

Another object of the present invention is to provide a seam in liquid form without there being spreading of the liquid to adjacent porous material.

A still further object of the present invention is to eliminate any harmful effects of impurities in the liquid seal material, such as particles of cured material, film, air bubbles and the like.

Another object of the present invention is to provide a method of making a seam from liquid such that the apparatus used will be self-cleaning as a consequence of such method.

Other objects, features and additional advantages of the present invention will become apparent to those skilled in the art from the drawing and the detailed description relating thereto.

BRIEF DESCRIPTION OF THE DRAWINGS

FIG. 1 is a schematic elevational view, partly in cross-section, of a device utilizing the method of the present invention for making a seam according to the invention;

FIG. 2 is a schematic diagram of a portion of FIG. 1 taken substantially along the line II—II;

FIG. 3 is a fragmentary enlarged cross-sectional view of a portion of FIG. 1 showing application of latex;

FIG. 4 is an enlarged fragmentary portion of a seam according to the invention; and FIG. 5 is a further enlarged cross-sectional view taken along line V—V of FIG. 4.

AS SHOWN ON THE DRAWINGS

The principles of the present invention are particularly useful when embodied in a seam construction such as shown in enlarged form on FIG. 4, generally indicated by the numeral 10. The seam 10 is applied to at least two layers of clothing-type porous sheet material 11,12 (FIG. 5) which are in contact with each other. The seam 10 includes a bead 13, the thickness of which has been somewhat exaggerated for clarity of illustration in FIG. 5. The bead 13 comprises cured nitrile latex material, and the bead 13 is disposed on one side of the layer 11, remote from the layer 12. However, a portion of the bead material extends transversely through the layer 11 and transversely into the pores of the layer 12. Both edges of the bead 13 are sharply defined because there is a substantial absence of bead material in the immediately adjacent porous sheet material, while the bead material fills the pores at the bead 13. The bead has a substantially flat cross-section and its thickness, at one side of the layers, is approximately the same as the thickness of one of the layers of porous sheet material.

Not all latex material can be used to make the seam 10. For example, the type of latex used on paper tablets is too weak. However, it has been found that nitrile latex is ideally suited for the present purpose. This material is available from B. F. Goodrich Chemical Company under their trademark "HYCAR", and is also identified by that source as "1570×60". Another nitrile latex is available from General Latex and Chemicals Ltd. of Canada, their identification being "1-N-5507". This material has a disadvantage in that when it combines with air molecules, a film forms, and this problem is aggravated when there is agitation of the latex. This problem has been fully overcome as is explained below. Further, no matter what apparatus the nitrile latex is used with, there is a tendency for the formation of a film of cured latex on such apparatus. The nitrile latex can cure at room temperature surrounded by atmospheric air, and while this is an advantage so far as the seam is concerned, it is a disadvantage in that a film of cured latex can form on the portions of the apparatus that the liquid latex contacts, and in the liquid latex in the apparatus.

The description which follows is that of an apparatus which may be utilized to practice the method of the present invention and this apparatus minimizes the amount of air that is in contact with nonapplied latex and minimizes the agitation of the latex.

As shown in FIG. 1, there is provided a flat reservoir 14 which has a cavity 15 which is normally full of uncured liquid nitrile latex material, the supply thereof being replenished through a line 16 which can do so once per manufacturing cycle. The reservoir 14 has a closed bottom, closed sides, and a cylinder-like projection 17 of rectangular cross-section as shown in FIG. 2 having a central opening 18 within which is disposed a piston 19 of corresponding cross-section, there being a seal 20 acting between the cylinder-like portion 17 and the piston 19. This piston 19 is connected to a rod 21 which is part of a conventional fluid actuator 22 which is under the control of a manually operable valve 23. When the piston 19 is retracted as shown, liquid nitrile latex can enter the apparatus through the line 16 and flow by gravity to its own level so as to fill the portion 15 and also a rectangular riser 24 that defines a working area 25. The size, shape, area and the like of the working area is adapted in accordance with the shape of the article or the shape of the seam to be made. The structure shown here is illustrative only, but it embodies the principles set forth herein. As best seen in FIG. 2, there is a schematic illustration by means of which a number of articles can be simultaneously produced. For each article, there is provided at least one knife edge 26 supported on the bottom of the reservoir, thus comprising a sort of dam which permits the liquid latex to surround the knife edge but not to enter within it. Above the working area 25, there is disposed a backup plate 27 carried on a rod 28 of a second fluid actuator 29 which is under the control of a valve 30.

When a seam is to be made, such as is involved in forming a pair of gloves or mittens, the layers of clothing-type porous sheet material 11,12 are tensioned in a hoop assembly 31 and placed above the knife edge 26, after which the valve 30 is actuated to bring the backup plate 27 downwardly so as to coact with the knife edge or edges 26 on the layers of clothing-type porous sheet material 11,12. Such force creates a concentration of pressure along the knife edge so as to collapse the porosity of the material to limit the spread of liquid latex. Then the other valve 23 is actuated so as to pressurize the liquid latex, and so as to cause it to rise within the riser 24 against all the exposed portion of the lower layer 11, during which time some of the liquid latex will flow through the pores of the lower layer 11, transversely to the plane thereof, and into the adjacent pores of the layer 12. After a brief application, the actuator 22 is first retracted and then the actuator 29 is retracted to enable removal of the hoop 31. The article or seam is then permitted to cure under atmospheric conditions, for example from 15 minutes to over-night and then the hoop 31 could be removed. The curing time can be accelerated if desired by known methods.

The hoop assembly 31 is conventional and includes an inner ring and an outer tensioned ring which correspond in principle to the kind used in connection with embroidering or quilt decorating.

After the article has cured, it is removed from the hoop assembly 31 and such trimming is carried out as may be desired.

In the schematic example of knife edges 26 shown in FIG. 2, the matrix surrounding the various knife edges would all be bonded together and be the seam. Thus surplus material would be trimmed off by cutting within the seam along the edge of the bead to leave the mitten or glove-shaped portion joined together by a narrow portion of the seam along its periphery, the trimming going into the non-joined cloth at the wrists to provide the usual entry. If desired, these articles can then be reversed.

The example of article given in FIG. 2 is schematic and in an actual installation, the articles would be placed closer together so as to minimize the amount of wasted material. For example, if two of the straight sides of the knife edge 26 were brought together to be approximately one-fourth inch apart, one would have a structure such as is shown in FIG. 3. Under that condition, after curing has taken place, the severing can take place centrally of the seam so that no material is discarded at that area.

If a straight seam is desired, the knife edges 26 can be straight and parallel to each other and would replace knife edges that follow the profile of an article.

Further, if desired, what appears as a single knife edge in FIG. 2 can be made as a double knife edge around the profile of the article and such double-knife construction for opposite sides of the seam would still have the cross-sectional configuration shown in FIG. 3, but following the profile of the article.

The interior of the cylinder-like portion 17, the interior of the riser 24, the knife edges 26 and the interior of the reservoir 15 are all preferably coated with a non-porous coating or release agent such as urethane, teflon or the like. If there is any latex that partially cures or forms a film on these articles, during usage, such film will come off by itself as small particles. Further, there may be some tiny air bubbles in the liquid latex. Although the apparatus illustrated minimizes agitation of latex and minimizes the amount of air that can come in contact with it, there will nevertheless be some discontinuities in the form of small air bubbles, small cured particles or small pieces of film present in the liquid that is to engage the lower level of the porous sheet material. However, the lower layer 11 serves as a filter and keeps all these discontinuities on the outside in the bead 13 where their presence is harmless. One such bubble is shown at 32 in FIG. 5 and small pieces of film are shown at 33 in FIG. 4, there being additional discontinuities shown in FIG. 4 as having been filtered out by the layer 11.

The term "knife edge" as used herein has been used in a bearing sense and not in a cutting sense.

Uncured liquid nitrile latex material has the property that it will completely impregnate the spaces between and embed all fibers of cloth sheet material. Cured nitrile latex material has a strong cohesive property, it resists cleavage stress, and has a flexibility comparable to cloth sheet material to which it is bonded. The term "nitrile latex material" as used herein is intended to encompass any other material which would exhibit equivalent physical properties.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A seam construction, comprising:
   (a) a pair of juxtaposed layers of porous sheet material in contact with each other; and (b) a bead of cured nitrile latex material disposed on one side of one of said layers remote from the other layer, a portion of said bead material extending transversely through said one layer and transversely into the pores of said other layer, at least one edge of said bead being sharply defined by the substantial absence of bead material in the immediately adjacent porous sheet material.

2. A seam construction according to claim 1, said bead having a flat cross-section of a thickness corresponding substantially to the thickness of one of said layers of clothing-type porous sheet material.

3. A method of making a seam comprising:
 (a) placing a pair of layers of porous sheet material in contact with each other;
 (b) temporarily clamping said layers together along at least one edge of the prospective bead to at least temporarily eliminate the porosity thereof in the immediately adjacent sheet material;
 (c) applying uncured liquid nitrile latex material to only one side of one of said layers, some of said material passing through said one layer into the pores of the other layer; and
 (d) curing said material to form a bead having an edge with a sharp definition.

4. A method according to claim 3, said clamping comprising the application of the clamping force to a knife edge along said one edge of the prospective bead to said one side of one of said layers, and applying a reactive force to the oppositely directed side of the other layer.

5. A method according to claim 4, in which said reactive force is applied through a back-up plate.

6. A method according to claim 3, in which the amount of uncured material applied is just enough to enable the material to soak through said other layer.

7. A method according to claim 3, in which the uncured material contains some particles of cured material or film of such material, said one layer serving as a filter to remove such particles or film from the material before it passes through either layer.

8. A method according to claim 3, said layers being in a substantially horizontal position and the liquid being passed upwardly therethrough.

9. A method according to claim 3, including, thereafter trimming away the two layers projecting from one edge of the bead.

10. A method according to claim 3, including, the step of tensioning the porous layers before the layers are clamped.

11. A method according to claim 10, in which the tensioning step is followed by the clamping step, said clamping of the sheet material being between a knife edge and a backup plate to eliminate the porosity therebetween, and the liquid material being applied under pressure.

12. A method according to claim 3, in which pressure is applied to the liquid material as it comes in contact with said one side, the oppositely facing side of the other layer being substantially at atmospheric pressure.

* * * * *